US012179737B2

(12) United States Patent
Chen et al.

(10) Patent No.: US 12,179,737 B2
(45) Date of Patent: Dec. 31, 2024

(54) UNMANNED GROUND VEHICLE AND METHOD FOR OPERATING UNMANNED GROUND VEHICLE

(71) Applicant: GEOSAT Aerospace & Technology, Tainan (TW)

(72) Inventors: Hsin-Yuan Chen, Tainan (TW); Chien-Hung Liu, Tainan (TW); Wei-Hao Wang, Tainan (TW); Yi-Bin Lin, Tainan (TW); Yi-Chiang Yang, Tainan (TW)

(73) Assignee: GEOSAT AEROSPACE & TECHNOLOGY, Tainan (TW)

( * ) Notice: Subject to any disclaimer, the term of this patent is extended or adjusted under 35 U.S.C. 154(b) by 70 days.

(21) Appl. No.: 16/656,243

(22) Filed: Oct. 17, 2019

(65) Prior Publication Data

US 2020/0122711 A1 Apr. 23, 2020

(30) Foreign Application Priority Data

Oct. 19, 2018 (TW) .................................. 107137024

(51) Int. Cl.
*B60W 20/12* (2016.01)
*B60W 20/15* (2016.01)
(Continued)

(52) U.S. Cl.
CPC ............ *B60W 20/12* (2016.01); *B60W 20/15* (2016.01); *B60W 40/105* (2013.01);
(Continued)

(58) Field of Classification Search
CPC ........ A01D 34/00; A01D 42/00; A01D 43/00; B60W 20/12; B60W 20/15; B60W 40/105;
(Continued)

(56) References Cited

U.S. PATENT DOCUMENTS 7,079,943 B2 * 7/2006 Flann .................... G01C 21/005
701/423
7,734,387 B1 6/2010 Young et al.
(Continued)

FOREIGN PATENT DOCUMENTS

CN 105911985 A 8/2016
CN 206421229 U 8/2017
(Continued)

*Primary Examiner* — Jaime Figueroa
*Assistant Examiner* — Joshua Alexander Garza
(74) *Attorney, Agent, or Firm* — McClure, Qualey & Rodack, LLP

(57) ABSTRACT

An unmanned ground vehicle (UGV) includes one or more motors configured to drive one or more wheels of the UGV, an obstacle sensor, a memory storing instructions, and a processor coupled to the one or more motors, the obstacle sensor, and the memory. The processor is configured to execute the instructions to cause the UGV to obtain location information of multiple navigation points; calculate a navigation path based on the obtained location information; drive the one or more motors to navigate the UGV along the navigation path; detect, by the obstacle sensor, whether one or more obstacles exist while navigating the UGV, and if detected, determine location information of the one or more obstacles; and if the one or more obstacles are detected by the obstacle sensor, update the navigation path based on determined location information of the one or more obstacles.

45 Claims, 11 Drawing Sheets

(51) Int. Cl.
  *B60W 40/105* (2012.01)
  *G05D 1/00* (2024.01)
  *G08G 1/133* (2006.01)
(52) U.S. Cl.
  CPC ........... *G05D 1/0212* (2013.01); *G05D 1/027*
    (2013.01); *G05D 1/12* (2013.01); *G08G 1/133*
    (2013.01); *B60W 2554/00* (2020.02)
(58) Field of Classification Search
  CPC . B60W 2554/00; G05D 1/0212; G05D 1/027;
    G05D 1/12; G08G 1/133
  See application file for complete search history.

(56) References Cited

U.S. PATENT DOCUMENTS

| | | | |
|---|---|---|---|
| 8,948,935 | B1 | 2/2015 | Peeters et al. |
| 9,415,513 | B2 * | 8/2016 | Tian ....................... B25J 19/023 |
| 10,134,135 | B1 * | 11/2018 | Zhang ....................... G06T 7/73 |
| 10,375,359 | B1 | 8/2019 | Beard et al. |
| 10,399,564 | B2 | 9/2019 | MacNeille |
| 10,602,659 | B2 | 3/2020 | Ito |
| 2004/0163373 | A1 * | 8/2004 | Adams ................... A01D 34/78 56/10.2 R |
| 2008/0228395 | A1 | 9/2008 | Kobori |
| 2009/0222160 | A1 | 9/2009 | Morselli |
| 2010/0017046 | A1 | 1/2010 | Cheung |
| 2010/0063680 | A1 | 3/2010 | Tolstedt |
| 2010/0183409 | A1 | 7/2010 | Checketts |
| 2012/0072052 | A1 * | 3/2012 | Powers ............... G06F 3/04815 701/2 |
| 2012/0330527 | A1 | 12/2012 | Kumabe |
| 2013/0098700 | A1 | 4/2013 | Zhang |
| 2013/0161419 | A1 | 6/2013 | Funseth |
| 2013/0166157 | A1 | 6/2013 | Schleicher |
| 2015/0094879 | A1 * | 4/2015 | Pari .......................... B25J 5/007 701/2 |
| 2015/0336575 | A1 * | 11/2015 | Zeng .......................... B60T 7/22 701/1 |
| 2016/0174459 | A1 * | 6/2016 | Balutis ................. G05D 1/0234 701/25 |
| 2016/0209511 | A1 | 7/2016 | Dolinar |
| 2016/0271795 | A1 * | 9/2016 | Vicenti ................ G05D 1/0219 |
| 2016/0334230 | A1 | 11/2016 | Ross |
| 2016/0334797 | A1 | 11/2016 | Ross |
| 2017/0090480 | A1 | 3/2017 | Ho |
| 2017/0131718 | A1 | 5/2017 | Matsumura |
| 2017/0168501 | A1 | 6/2017 | Ogura et al. |
| 2017/0219353 | A1 * | 8/2017 | Alesiani ................ G05D 1/0212 |
| 2019/0086925 | A1 * | 3/2019 | Fan ....................... G05D 1/0088 |
| 2019/0176829 | A1 | 6/2019 | Luders |
| 2019/0187703 | A1 * | 6/2019 | Millard .................... G05D 1/0246 |
| 2019/0217319 | A1 * | 7/2019 | Harvey .................... B05B 12/02 |
| 2019/0278269 | A1 * | 9/2019 | He ........................ G05D 1/0022 |
| 2020/0042009 | A1 | 2/2020 | Yang |
| 2020/0064857 | A1 * | 2/2020 | Gagne ................. A47L 11/4036 |
| 2020/0201347 | A1 * | 6/2020 | Dalfra .................... G05D 1/027 |
| 2020/0208993 | A1 * | 7/2020 | Appelman ......... B62D 15/0265 |
| 2020/0241554 | A1 * | 7/2020 | Takahashi ............ G01S 17/931 |
| 2020/0326712 | A1 | 10/2020 | Tang |

FOREIGN PATENT DOCUMENTS

| | | |
|---|---|---|
| CN | 108345310 A | 7/2018 |
| CN | 108664544 A | 10/2018 |
| CN | 109634276 A | 4/2019 |
| JP | 2004351992 A | 12/2004 |
| KR | 10-2015-0086065 | 7/2015 |
| KR | 10-2019-0140491 | 12/2019 |
| WO | WO2016/012867 A2 | 1/2016 |

\* cited by examiner

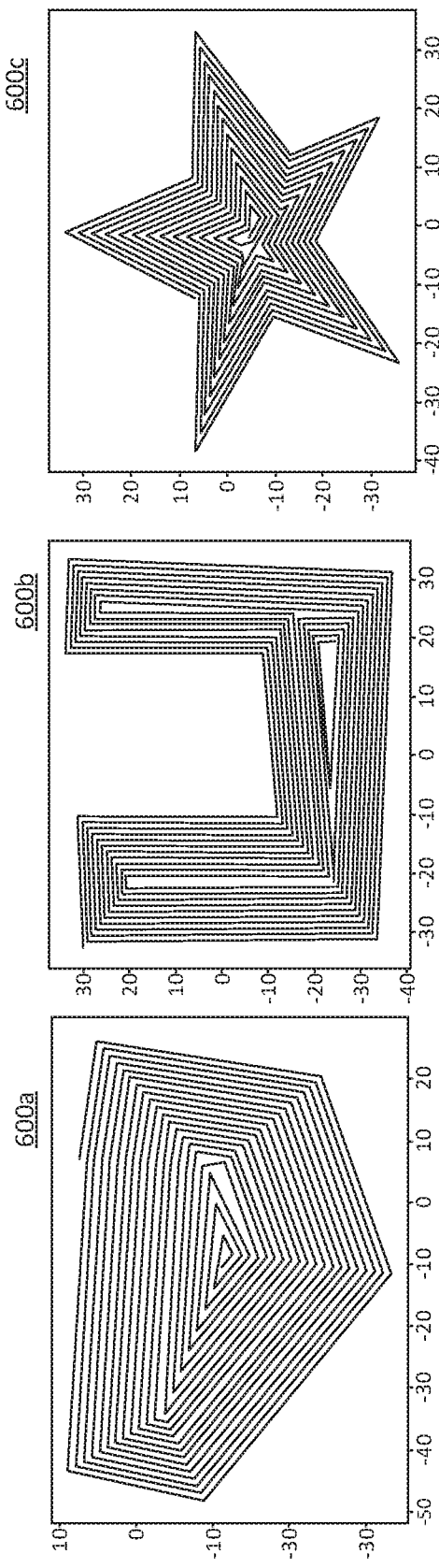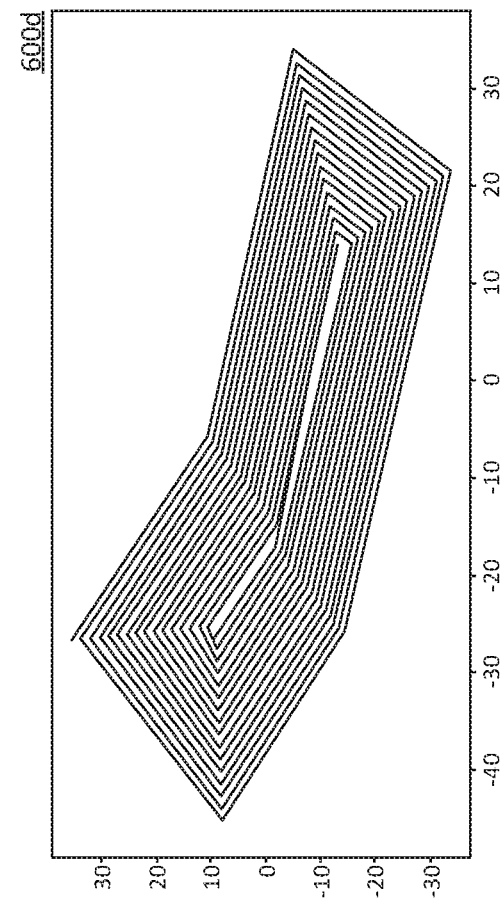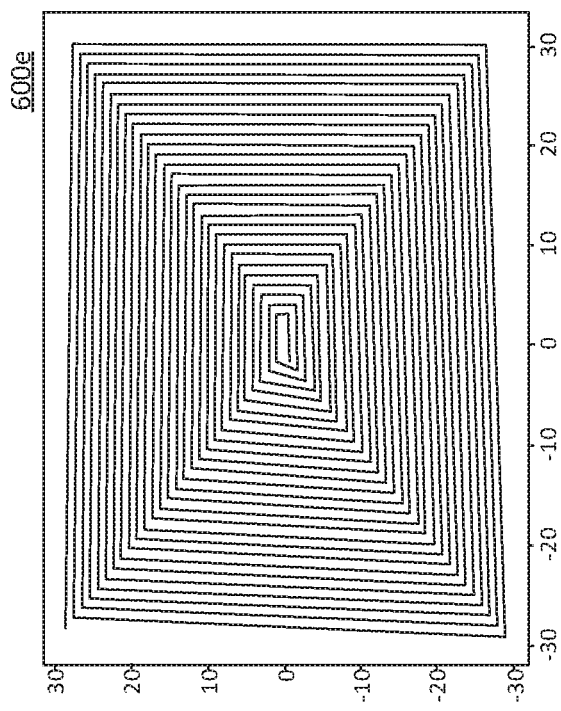
FIG. 6A  FIG. 6B  FIG. 6C  FIG. 6D  FIG. 6E

UNMANNED GROUND VEHICLE AND METHOD FOR OPERATING UNMANNED GROUND VEHICLE

CROSS-REFERENCE TO RELATED APPLICATION

The present application claims priority to Taiwan Patent Application No. 107137024, filed on Oct. 19, 2018, entitled "UNMANNED GROUND VEHICLE PLATFORM," which is incorporated herein by reference in its entirety.

TECHNICAL FIELD

The present disclosure relates to unmanned ground vehicles (UGVs), and more particularly, to methods and systems for operating unmanned ground vehicles.

BACKGROUND

Nowadays, various machines, such as spray machines and cutting machines, are applied in agricultural processes to improve farm productivity and profitability. However, traditional agricultural machines still rely heavily on manual operation or control, which is very time consuming and a waste of manpower and resources. In addition, manual processes also result in low production efficiency and inconsistent quality. Accordingly, there is a need to improve agricultural machines and their operations, in order to overcome these and other shortcomings.

SUMMARY

The present disclosure provides a non-transitory computer-readable medium storing instructions executable by a processor to perform a method for operating an unmanned ground vehicle (UGV) including one or more motors and an obstacle sensor. The method for operating the UGV includes obtaining location information of a plurality of navigation points; calculating a navigation path based on the obtained location information; driving the one or more motors to navigate the unmanned ground vehicle along the navigation path; detecting, by the obstacle sensor, whether one or more obstacles exist while navigating the unmanned ground vehicle, and if detected, determining location information of the one or more obstacles; and if the one or more obstacles are detected by the obstacle sensor, updating the navigation path based on determined location information of the one or more obstacles.

The present disclosure also provides a method for operating an unmanned ground vehicle (UGV) including one or more motors and an obstacle sensor. The method for operating UGV includes obtaining location information of a plurality of navigation points; calculating a navigation path based on the obtained location information; driving the one or more motors to navigate the unmanned ground vehicle along the navigation path; detecting, by the obstacle sensor, whether one or more obstacles exist while navigating the unmanned ground vehicle, and if detected, determining location information of the one or more obstacles; and if the one or more obstacles are detected by the obstacle sensor, updating the navigation path based on determined location information of the one or more obstacles.

The present disclosure further provides an unmanned ground vehicle (UGV) including one or more motors configured to drive one or more wheels of the UGV, an obstacle sensor, a memory storing instructions, and a processor coupled to the one or more motors, the obstacle sensor, and the memory. The processor is configured to execute the instructions to cause the UGV to obtain location information of a plurality of navigation points; calculate a navigation path based on the obtained location information; drive the one or more motors to navigate the unmanned ground vehicle along the navigation path; detect, by the obstacle sensor, whether one or more obstacles exist while navigating the unmanned ground vehicle, and if detected, determine location information of the one or more obstacles; and if the one or more obstacles are detected by the obstacle sensor, update the navigation path based on determined location information of the one or more obstacles.

It is to be understood that the foregoing general description and the following detailed description are exemplary and explanatory only, and are not restrictive of the disclosure, as claimed.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIGS. 6A-6E are diagrams illustrating spiral route patterns to include coverage regions in the second navigation mode, consistent with some embodiments of the present disclosure.

DETAILED DESCRIPTION

The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

Figure 1:
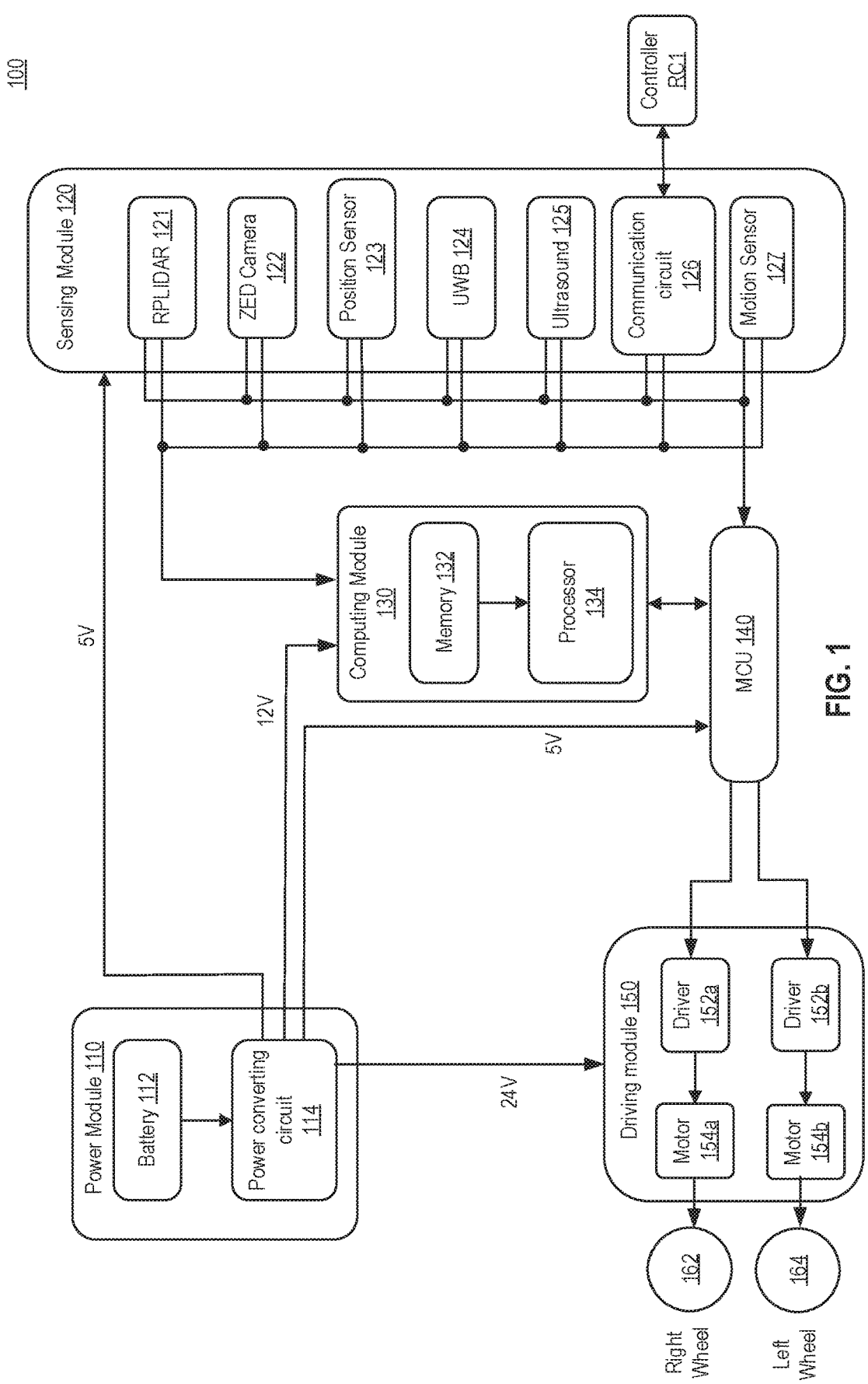
FIG. 1 is a diagram which illustrates an exemplary unmanned ground vehicle (UGV), consistent with some embodiments of the present disclosure.

FIG. 1 is a diagram which illustrates an exemplary unmanned ground vehicle (UGV) 100, consistent with some embodiments of the present disclosure. As shown in FIG. 1, UGV 100 includes a power module 110, a sensing module 120, a computing module 130, a microcontroller unit (MCU) 140, a driving module 150, and wheels 162, 164. Power module 100 is coupled to sensing module 120, computing module 130, MCU 140, and driving module 150 and configured to provide the electricity required by each module. In some embodiments, power module 100 may output and supply power having different voltage levels to different modules to meet the operating requirement of the modules. For example, power module 110 may include a battery 112 and a power converting circuit 114 coupled with battery 112. Power converting circuit 114 is configured to convert the power from battery 112 and supply different output voltages to sensing module 120, computing module 130, MCU 140, driving module 150, or other modules which need electricity. As shown in FIG. 1, in some embodiments, the voltage provided to driving module 150 is 24 volts, the voltage provided to computing module 130 is 12 volts, and the voltage provided to each of sensing module 120 and MCU 140 is 5 volts, but the embodiment shown in FIG. 1 is not intended to limit the present disclosure. More particularly, power converting circuit 114 can include a buck converter, a boost converter, a buck-boost converter, or other types of converting circuits to regulate and provide the output voltages having different voltage levels.

Sensing module 120 may include different sensors for receiving commands, detecting surrounding environments, obtaining location information of UGV 100, and monitoring the operation of UGV 100. Data and signals obtained by the sensors can be transmitted to computing module 130 and MCU 140, which are both communicatively coupled to the sensors, for further computing in order to control UGV 100. As shown in FIG. 1, sensing module 120 may include a Light Detection and Ranging (LIDAR) sensor 121, such as a RPLIDAR sensor, a camera 122, such as a ZED camera, a position sensor 123, an Ultra-wideband (UWB) sensor 124, an ultrasound sensor 125, a communication circuit 126, and a motion sensor 127. In different embodiments, one or more sensors mentioned above are optional and can be eliminated to reduce manufacturing costs.

In some embodiments, position sensor 123 is configured to determine a current position of UGV 100. In different embodiments, position sensor 123 may be implemented by various Global Positioning System (GPS) sensors, which includes an onboard receiver configured to receive data signals transmitted from one or more satellites in a global positioning satellite constellation. In addition, position sensor 123 may be implemented by a Real Time Kinematic-Global Positioning System (RTKGPS) sensor, which uses the carrier wave of the signals transmitted from satellite(s) and further receives correction data from a fixed base station. Accordingly, position sensor 123 is capable of determining and monitoring an absolute position of UGV 100 based on the received data signals continuously, periodically, or intermittently. In addition, during the operation of UGV 100, position sensor 123 may also determine and record the current position of UGV 100 with a timestamp, periodically or intermittently. The recording of the current position of UGV 100 may be performed automatically, based on one or more preset rules, or manually. That is, computing module 130 or MCU 140 can trigger the position recording when one or more conditions are met, such as conditions related to an operation time, a moving distance, a battery status, etc.

Furthermore, UGV 100 can transmit data to and communicate with other electronic devices through communication circuit 126. For example, communication circuit 126 may include a Radio Controller (RC) transmitter/receiver. UGV 100 can receive a radio signal from an external remote controller RC1, by means of the RC transmitter/receiver. Accordingly, a user can control UGV 100 to perform operations and set one or more operating modes of UGV 100 by means of remote controller RC1. In some embodiments, communication circuit 126 may also include other wireless signal transmitters/receivers, such as a Bluetooth module, a Wi-Fi module, etc. The user can run a control application on a desktop computer, a laptop, a tablet, a smartphone, or any other electronic devices to transmit wireless signals to UGV 100 or receipt by a wireless signal receiver of communication circuit 126 to control UGV 100 accordingly.

In some embodiments, motion sensor 127 is communicatively coupled to computing module 130 and MCU 140 and configured to determine one or more motion parameters of UGV 100 and transmit the determined motion parameter(s) to computing module 130 for further data computing and control of UGV 100. For example, the motion parameter(s) determined by motion sensor 127 may include velocity, acceleration, or other parameters to describe movements of UGV 100. In some embodiments, motion sensor 127 may be implemented by an Inertial Measurement Unit (IMU) sensor. More particularly, motion sensor 127 may include one or more sensing components such as a solid-state or microelectromechanical system (MEMS) accelerometer, a gravity sensor, a gyroscope, a magnetometer, and/or a rotation vector sensor, to sense velocity and/or acceleration of UGV 100, but the present disclosure is not limited thereto.

Computing module 130 may include an embedded computing device having a memory 132, and a processor 134 such as a Central Processing Unit (CPU) or a Graphics Processing Unit (GPU) to perform various computation tasks on the data received from sensing module 120 and from MCU 140. More particularly, memory 132 can store data and/or software instructions for execution by processor 134 to perform operations consistent with the disclosed embodiments. For example, processor 134 can be configured to execute a set of instructions stored in memory 132 to cause UGV 100 to perform a method for operating UGV 100 in different operation modes, which is discussed in detail below. By performing such method, computing module 130 can determine the operation of UGV 100 and provide corresponding signals to MCU 140 to instruct MCU 140 to control driving module 150 that is communicatively coupled to MCU 140. Driving module 150 includes drivers 152a, 154a and motors 154a, 154b coupled to drivers 152a, 154a respectively. Drivers 152a, 154a are configured to drive motors 154a, 154b. Motors 154a, 154b are coupled to corresponding wheels 162, 164, respectively, and are configured to drive wheels 162, 164 to control movement of UGV 100.

More particularly, when receiving the signals provided from computing module 130, MCU 140 can send control signals to driving module 150 to drive motors 154a, 154b and control movement of UGV 100. For example, by controlling motors 154a, 154b to rotate in a clockwise or an anticlockwise direction and controlling rotational speeds of motors 154a, 154b independently during the operation, MCU 140 can drive motors 154a, 154b in various operations to initiate, to accelerate, to decelerate, or to terminate the movement of UGV 100. In addition, MCU 140 can also control UGV 100 to change direction.

In various embodiments, the number of drivers 152a, 154a, motors 154a, 154b and corresponding wheels 162, 164 may be different. The embodiment illustrated in FIG. 1 is merely an example and not intended to limit the present disclosure. For example, UGV 100 may have three, four, five, six, or any number of motors/drivers coupled with corresponding wheels.

Memory 132 can be any of various computer-readable media implemented in any method or technology for storage of information such as computer-readable instructions, data structures, program modules, or other data. Memory 132 can be communicatively coupled with processor 134 via a bus. In some embodiments, memory 132 may include a main memory, such as, for example, a random-access memory (RAM) or other dynamic storage device, which can be used for storing temporary variables or other intermediate information during execution of instructions by processor 134. Such instructions enable UGV 100 to perform operations specified in the instructions. In some embodiments, processor 134 can be, for example, one or more central processors or microprocessors.

In some embodiments, before loaded into memory 132, the instructions may be stored in any of non-transitory storage media accessible to computing module 130. The term "non-transitory media" as used herein refers to any non-transitory media storing data or instructions that cause a machine to operate in a specific fashion. Such non-transitory media can include non-volatile media and/or volatile media. Non-transitory media include, for example, optical or magnetic disks, dynamic memory, a floppy disk, a flexible disk, hard disk, solid state drive, magnetic cassettes, magnetic tape, or any other magnetic data storage medium, a CD-ROM, digital versatile disks (DVD) or any other optical data storage medium, a Random Access Memory (RAM), a read-only memory (ROM), a Programmable Read-Only Memory (PROM), a EPROM, a FLASH-EPROM, NVRAM, flash memory, or other memory technology and/or any other storage medium with the same functionality that can be contemplated by persons of ordinary skill in the art to which this disclosure pertains. Other components known to one of ordinary skill in the art may be included in UGV 100 to process, transmit, provide, and receive information consistent with the disclosed embodiments.

Figure 2:
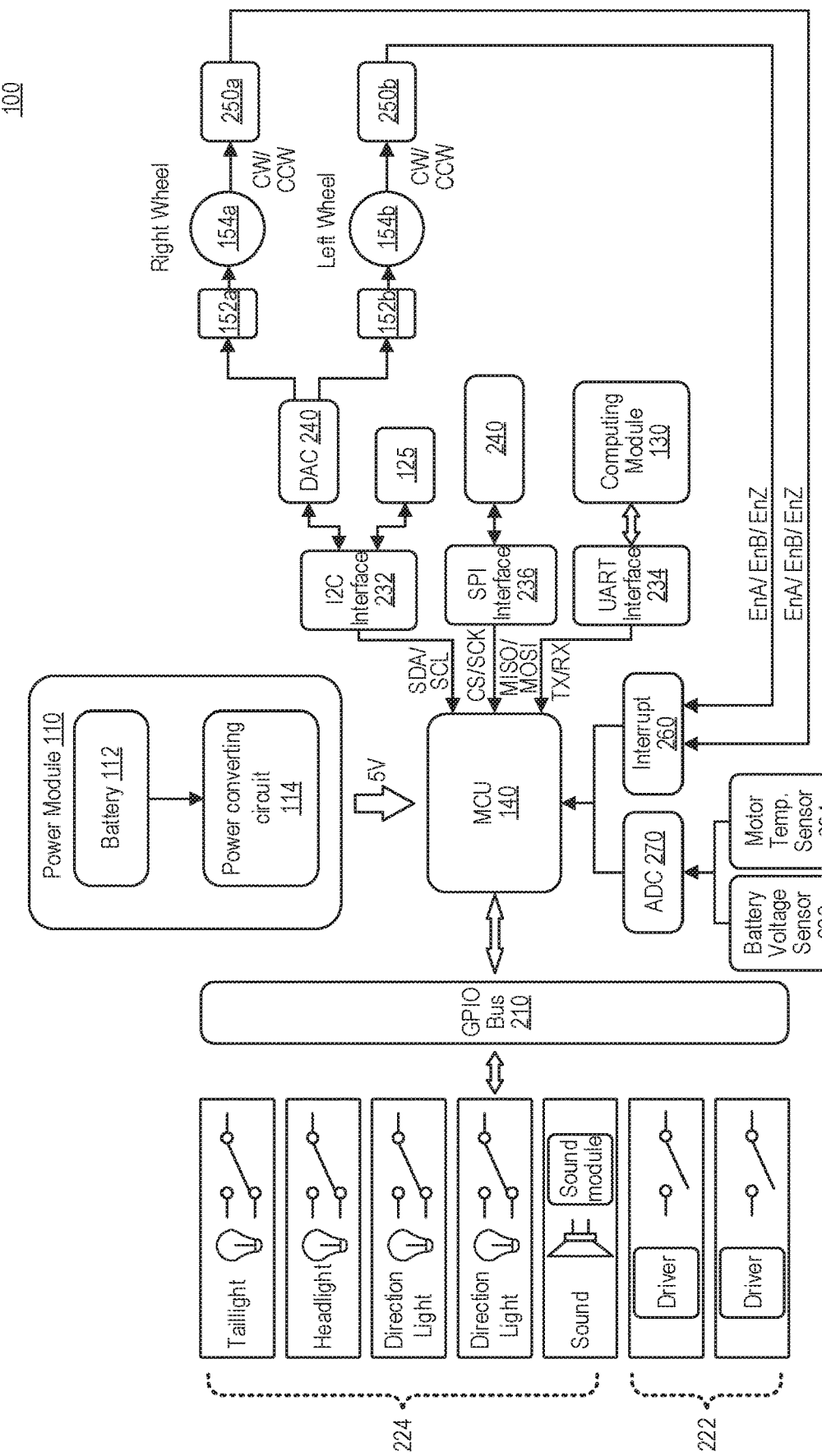
FIG. 2 is a diagram which illustrates a signal flow of the UGV, consistent with some embodiments of the present disclosure.

FIG. 2 is a diagram which illustrates a signal flow of UGV 100, consistent with some embodiments of the present disclosure. As shown in FIG. 2, MCU 140, via a General-Purpose Input/Output (GPIO) bus 210, communicates with and controls one or more function devices 222 and one or more output devices 224.

In some embodiments, UGV 100 may be used in agriculture applications. Function devices 222 may include a spray device for spraying liquid, such as water, fertilizer, or pesticide, when UGV 100 travels in a farm field or a meadow. In some embodiments, UGV 100 not only can activate the spray device to spray liquid along the navigation path of UGV 100 but can further control the spray device to determine an amount of liquid being sprayed based on a speed of UGV 100. More particularly, UGV 100 can control an actuating motor coupled to the spray device to control the amount of liquid being sprayed. In some embodiments, function devices 222 may include a cutting device. UGV 100 can activate the cutting device to remove or disrupt vegetation, such as weeds, along the navigation path when UGV 100 travels down a furrow in the farm field. In some embodiments, UGV 100 can further control a rotation speed of the cutting device based on a speed of UGV 100 by controlling an actuating motor coupled to the cutting device, to optimize the operation of the cutting device.

In addition, function devices 222 may also include a forklift device for carrying loads, or other devices to facilitate various applications of UGV 100. The embodiments mentioned herein are merely examples and not meant to limit the present disclosure.

Output devices 224 may include one or more light units, such as one or more taillights, headlights, and direction lights, and one or more speaker units. The light unit(s) and speaker unit(s) can produce light and sound signals indicating the operation status of UGV or for alerting or warning purposes.

In addition, MCU 140 further communicates with other units via an Inter-Integrated Circuit (I2C) interface 232, a Universal Asynchronous Receiver-Transmitter (UART) interface 234 and a Serial Peripheral Interface (SPI) interface 236. For example, MCU 140 provides digital signals to a digital-analog converter (DAC) 240 via I2C interface 232. DAC 240 is configured to convert the received digital signals into analog signals to drive drivers 152a and 152b. Thus, drivers 152a and 152b can drive motors 154a and 154b accordingly. Ultrasound sensor 125 also communicates with MCU 140 via I2C interface 232.

MCU 140 communicates with computing module 130 via UART interface 234. MCU 140 also communicates with a storage device 240, which may be internal or external drive, via SPI interface 236. In some embodiments, storage device 240 may include a Secure Digital card (SD card).

Motor encoders 250a, 250b may be rotary encoders mounted to motors 154a, 154b. By tracking the speeds and/or positions of shafts of motors 154a, 154b, motor encoders 250a, 250b respective provide closed loop feedback signals (e.g., EnA, EnB, EnZ) to a corresponding interrupt interface 260, such as one or more interrupt pins of MCU 140.

As shown in FIG. 2, MCU 140, via an analog-digital converter 270, communicates with one or more sensors monitoring UGV 100, such as a battery voltage sensor 282 and/or a motor temperature sensor 284. Accordingly, if the battery voltage is running low or the motor temperature exceeds a safety limit, MCU 140 can identify the status based on signals from the sensors and perform corresponding operations.

Figure 3:
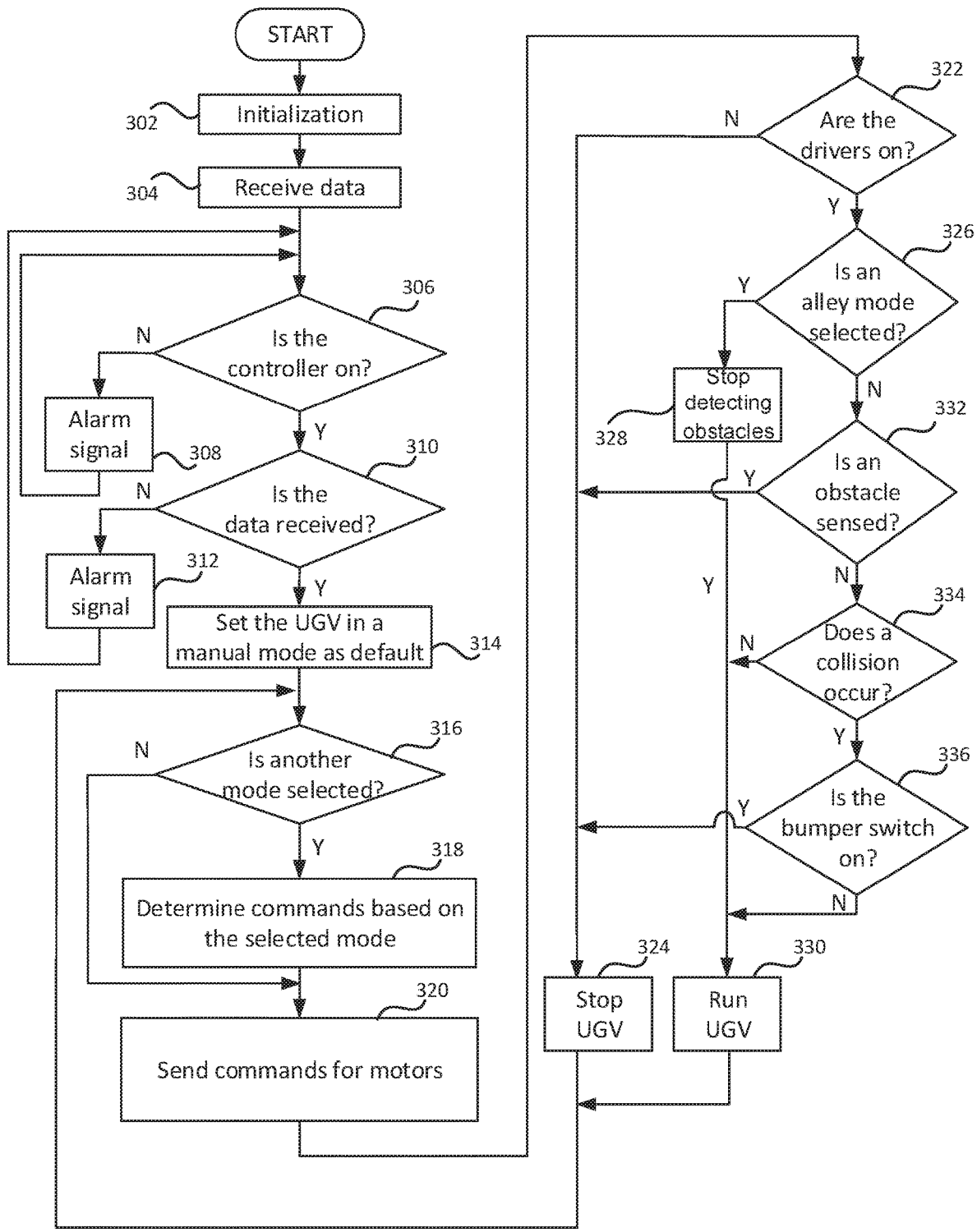
FIG. 3 is a flow diagram of an exemplary method for operating the UGV, consistent with some embodiments of the present disclosure.

FIG. 3 is a flow diagram of an exemplary method 300 for operating UGV 100, consistent with some embodiments of the present disclosure. Method 300 can be performed by a UGV (e.g., UGV 100 in FIGS. 1 and 2) including one or more motors, e.g., motors 154a, 154b, but the present disclosure is not limited thereto. In some embodiments, steps in method 300 can be performed by computing module 130. More particularly, in computing module 130, processor 134 can be configured to execute instructions stored in memory 132 to cause computing module 130 to perform steps of method 300 for operating UGV 100.

In step 302, after the user activates UGV 100, power module 110 starts supplying power to each functional module and computing module 130 performs a system initialization. When the system initialization is complete, in step 304, computing module 130 and MCU 140 start to receive data from sensing module 120. In step 306, UGV 100 determines whether controller RC1 is powered on and paired with communication circuit 126 successfully. Responsive to a determination that controller RC1 is not powered on and paired with communication circuit 126 successfully (step 306—no), UGV 100 performs step 308. In step 308, UGV 100 outputs a visual and/or audible alarm signal by means of output devices 224 to notify the user to turn on controller RC1. Then, UGV 100 repeats step 306, until controller RC1 is powered on and paired with communication circuit 126 (step 306—yes).

When controller RC1 is powered on and paired with communication circuit 126 (step 306—yes), in step 310 UGV 100 determines whether data from sensing module 120 is received successfully. Responsive to a determination that data receiving is unsuccessful (step 310—no), UGV 100 performs step 312. In step 312, UGV 100 outputs another visual and/or audible alarm signal by means of output devices 224 to notify the user that a fail-safe operation occurs. Then, UGV 100 repeats steps 306-310, until computing module 130 and MCU 140 successfully obtain data from sensing module 120 (step 310—yes). Then, in step 314, UGV 100 operates in a manual mode, as a default operating mode. In the manual mode, the user controls the movement of UGV 100 by sending commands from controller RC1.

In step 316, UGV 100 determines whether another operating mode is selected. More particularly, the user can send, from controller RC1, a mode selection signal to select the operating mode for UGV 100. In some embodiments, the user can further choose to enable or disable several functions, such as an obstacle-avoidance function or a collision avoidance function in any one of the operating modes. For example, when operated in a navigation mode, computing module 130 can calculate a navigation path based on navigation points set by the user and control UGV 100 to move along the calculated navigation path. On the other hand, when operated in a following mode, computing module 130 can obtain a current location of a movable target, such as the user, and then calculate a direction and a speed for UGV 100 to follow the movable target when the movable target moves. In addition, in any one of the operating modes, if the collision avoidance function is enabled, UGV 100 can lower the speed, or even stop when one or more obstacles exist on an estimated path for UGV 100. On the other hand, if the obstacle-avoidance is enabled, UGV 100 can update its navigation path in the navigation mode or the following mode in order to bypass the obstacle(s) in the current navigation path.

Responsive to a determination that another operating mode (e.g., the navigation mode or the following mode) is selected (step 316—yes), UGV 100 performs step 318. In step 318, UGV 100 determines, by computing module 130, commands to control motors 154a, 154b. Then, UGV 100 performs step 320. On the other hand, responsive to a determination that UGV 100 operates in the manual mode (step 316—no), UGV 100 performs step 320 directly. In step 320, UGV 100, by computing module 130 and MCU 140, sends commands for motors 154a, 154b to control the movement of UGV 100.

In step 322, UGV 100 determines whether drivers 152a, 152b are on. Responsive to a determination that drivers 152a, 152b are off (step 322—no), UGV 100 stops (step 324).

Otherwise (step 322—yes), UGV 100 further performs steps 326-336 to achieve the collision avoidance function. In step 326, UGV 100 determines whether UGV is operated in an alley mode. In response to a determination that the UGV 100 is operated in the alley mode (step 326—yes), UGV performs step 328 to inactivate an obstacle sensor (e.g., LIDAR sensor 121 or ultrasound sensor 125) to stop detecting whether one or more obstacles exist, and to run UGV 100 accordingly in step 330.

On the other hand, in response to a determination that the UGV 100 is not operated in the alley mode (step 326—no), UGV performs step 332 and determines whether an obstacle is sensed by the obstacle sensor (e.g., LIDAR sensor 121 or ultrasound sensor 125). Responsive to a determination that one or more obstacles are sensed (step 332—yes), UGV 100 performs step 324 and stops.

In some other embodiments, UGV 100 can perform a more detailed collision avoidance operation by detecting a distance between an obstacle and UGV 100, controlling the motors 154a, 154b to lower the speed of UGV 100 if the detected distance between the obstacle and UGV 100 is less than a first threshold (e.g., 1m), and controlling motors 154a, 154b to stop UGV 100 if the detected distance between the obstacle and UGV 100 is less than a second threshold (e.g., 60 cm) smaller than the first threshold. Accordingly, UGV 100 can first slow down and continue to monitor to see if the obstacle is removed or no longer in the path of its forward motion. For example, a human or an animal may be detected as an obstacle in front of UGV 100. In such circumstance, UGV 100 may slow down first. If the human or the animal steps away from the path, UGV 100 may speed up and resume its normal operation. On the other hand, if the human or the animal does not move, UGV 100 stops when the second threshold is reached.

Responsive to a determination that no obstacles are sensed (step 332—no), UGV 100 performs step 334 and further determines whether a collision occurs. Responsive to a determination that no collision occurs (step 334—no), UGV 100 performs step 330 and runs in its normal operation. On the other hand, responsive to a determination that a collision occurs (step 334—yes), UGV 100 performs step 336 and further determines whether a bumper switch is turned on. If the bumper switch is on (step 336—yes), UGV 100 performs step 324 and stops. Otherwise (step 336—no), UGV 100 performs step 330 and runs in its normal operation.

Accordingly, UGV 100 can repeatedly perform steps 316-336 and move manually or automatically based on commands from the user in the manual mode or based on commands from computing module 130 in the navigation mode or the following mode, until the user shuts down UGV 100. Method 300 shown in FIG. 3 is merely an example and not meant to limit the present disclosure. For example, in some embodiments, if the collision avoidance function is disabled, steps 326, 328, and 332-336 may be bypassed. UGV 100 may perform step 330 and run in its normal operation directly when drivers 152a, 152b are on (step 322—yes).

Figure 4:
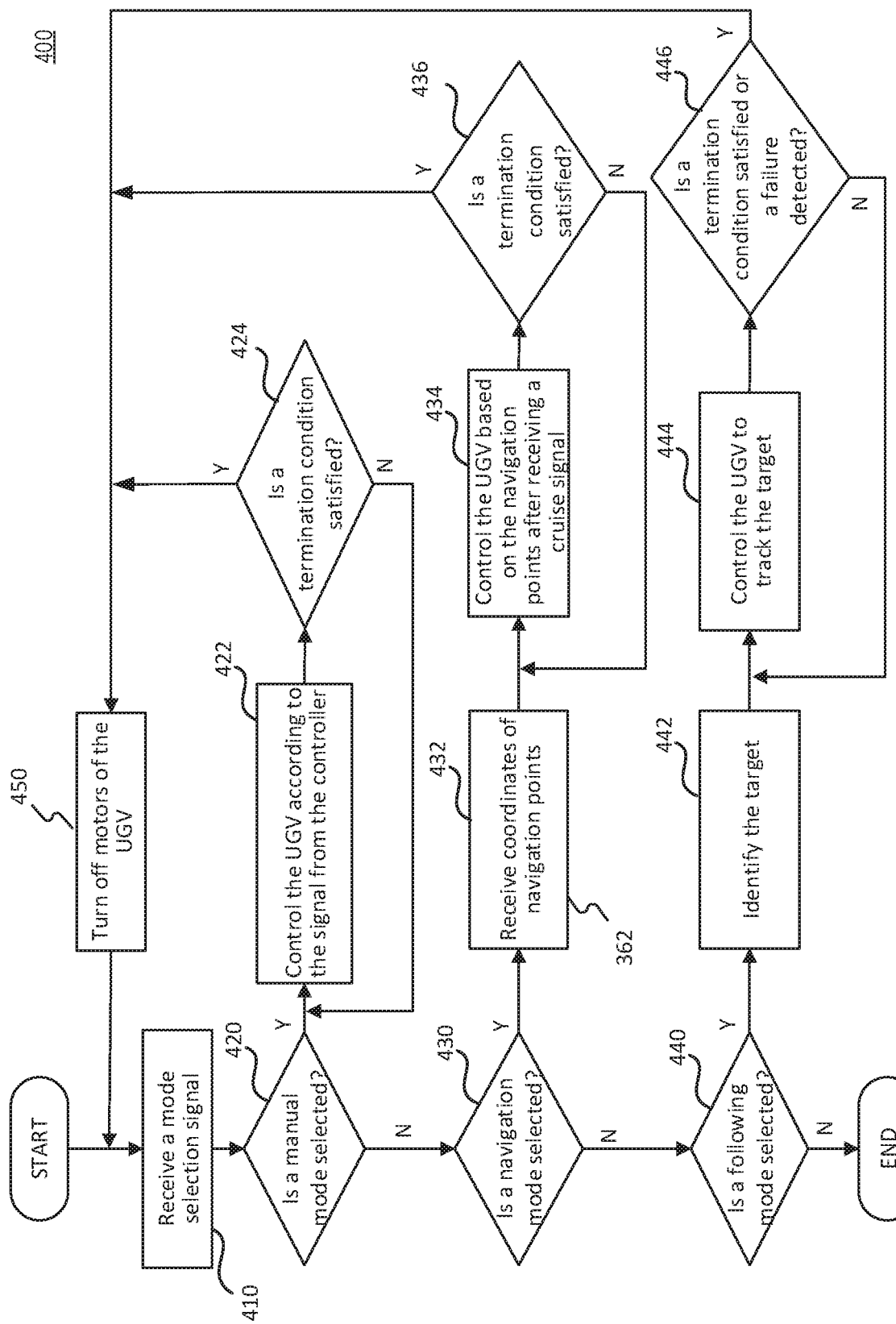
FIG. 4 is a flow diagram of an exemplary method for operating the UGV, consistent with some embodiments of the present disclosure.

For a further understanding of steps 316, 318 and computation performed by computing module 130 in different operating modes, reference is made to FIG. 4. FIG. 4 is a flow diagram of an exemplary method 400 for operating UGV 100, consistent with some embodiments of the present disclosure. Similarly, steps in method 400 can be performed by processor 134 by executing instructions stored in memory 132.

In step 410, computing module 130 receives a mode selection signal from controller RC1. In steps 420, 430, and 440, computing module 130 determines the operation mode of UGV 100 based on the mode selection signal. More particularly, in step 420, computing module 130 determines whether a manual mode is selected based on the mode selection signal. If the manual mode is selected (step 420— yes), computing module 130 performs steps 422 and 424 to operate UGV 100 in the manual mode. Otherwise (step 420—no), in step 430 computing module 130 determines whether a navigation mode is selected based on the mode selection signal. If the navigation mode is selected (step 430—yes), computing module 130 performs steps 432, 434, and 436 to operate UGV 100 in the navigation mode. Otherwise (step 430—no), in step 440 computing module 130 determines whether a following mode is selected based on the mode selection signal. If the following mode is selected (step 440—yes), computing module 130 performs steps 442, 444, and 446 to operate UGV 100 in the following mode.

If UGV 100 operates in the manual mode, in step 422, UGV 100 is controlled according to signals received from controller RC1. The user can manually adjust the speed and/or direction of UGV 100 by sending corresponding commands to UGV 100. When a termination condition is satisfied (step 424—yes), UGV 100 performs step 450 and turn off motors 154*a*, 154*b* accordingly. Otherwise (step 424—no), UGV 100 repeats steps 422 and 424 until the termination condition is satisfied. In the manual mode, the user can enable or disable the obstacle avoidance function manually, which is discussed below.

Figure 5A:
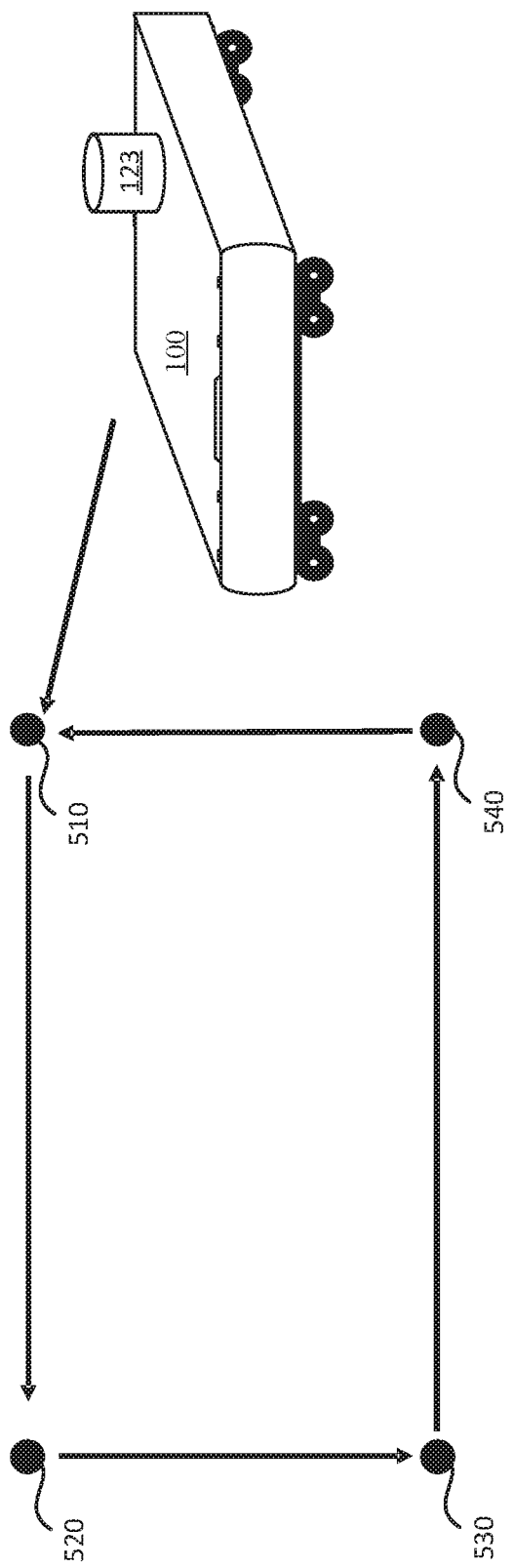
FIG. 5A is a diagram which illustrates an exemplary navigation path for a first navigation mode of the UGV, consistent with some embodiments of the present disclosure.
Figure 5B:
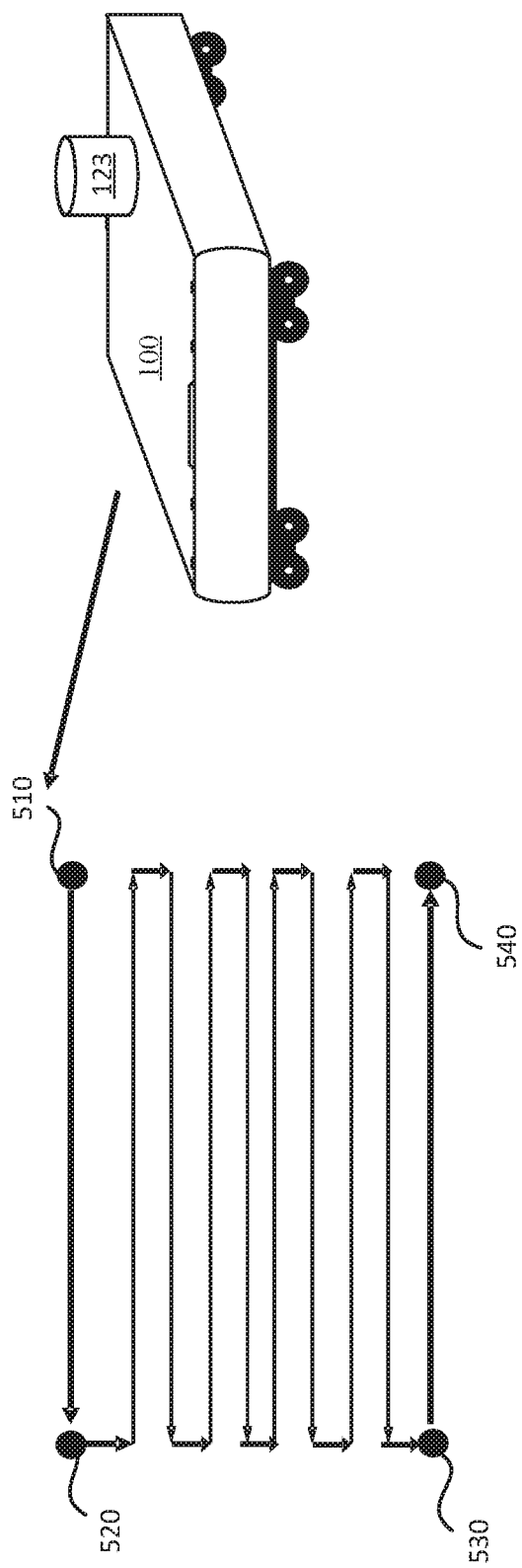
FIG. 5B and FIG. 5C are diagrams which illustrate exemplary navigation paths for a second navigation mode of the UGV, consistent with some embodiments of the present disclosure.
Figure 5C:
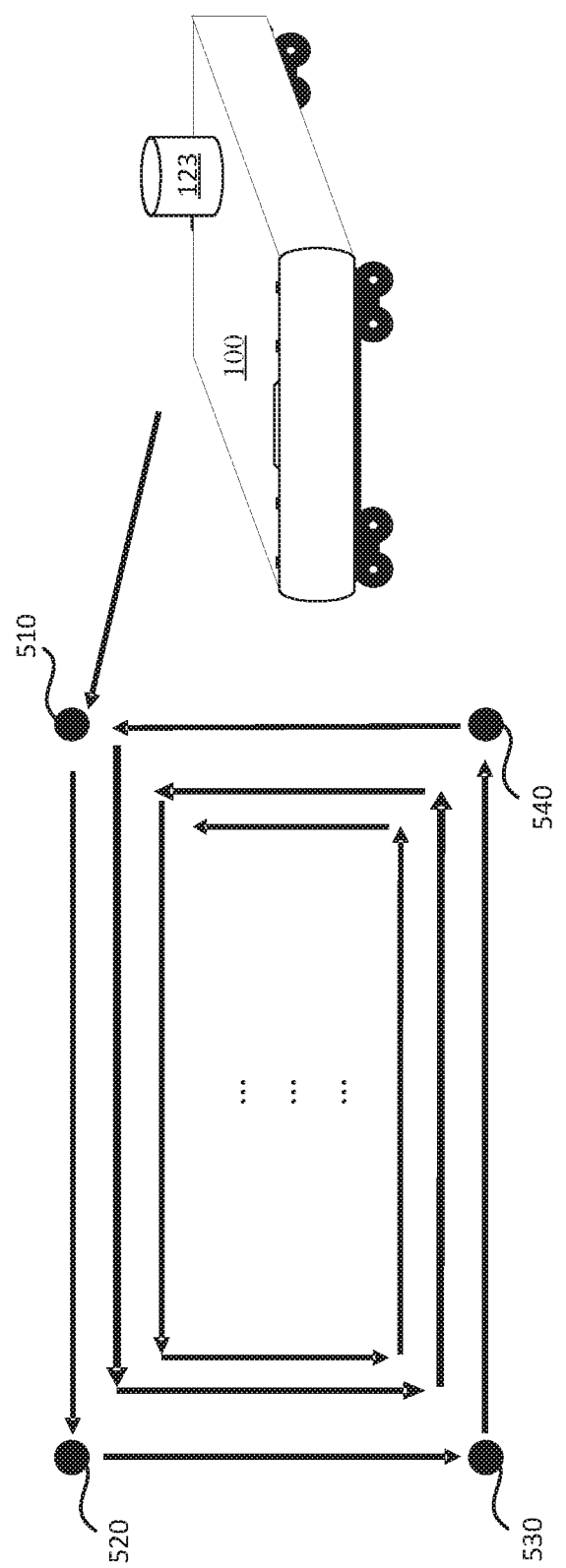

For further understanding of the operations in a first and a second navigation mode, reference is also made to FIGS. 5A, 5B and 5C, which are diagrams illustrating different navigation paths determined by computing module 130, consistent with some embodiments of the present disclosure. When UGV 100 operates in the navigation mode, in step 432, UGV 100 receives coordinates of multiple navigation points, such as navigation points 510, 520, 530, 540 in FIGS. 5A, 5B and 5C. More particularly, computing module 130 is configured to obtain location information of navigation points 510, 520, 530, 540. For example, the user may first control UGV 100 manually to travel to navigation points 510, 520, 530, 540 and send a recording signal from controller RC1. UGV 100 receives the recording signal from controller RC1 operated by the user and, in response to receiving the recording signal, UGV 100 records global positioning system (GPS) coordinates of UGV 100 as the location information of one of navigation points 510, 520, 530, 540. In some other embodiments, UGV 100 may also receive the location information of navigation points 510, 520, 530, 540 inputted by the user from controller RC operated by the user.

After the location information of navigation points 510, 520, 530, 540 are all recorded or received, in step 434 UGV 100 is controlled by computing module 130 based on the navigation points after receiving a cruise signal from received from controller RC1.

More particular, computing module 130 is configured to calculate a navigation path based on the obtained location information and to control drivers 152*a*, 152*b* to drive motors 154*a*, 154*b* to navigate UGV 100 along the calculated navigation path.

FIG. 5A is a diagram which illustrates an exemplary navigation path for a first navigation mode of UGV 100, consistent with some embodiments of the present disclosure. As shown in FIG. 5A, in the first navigation mode, computing module 130 is configured to calculate a navigation path to move UGV 100 between navigation points 510, 520, 530, 540.

On the other hand, FIG. 5B and FIG. 5C are diagrams which illustrate exemplary navigation paths for a second navigation mode of UGV 100, consistent with some embodiments of the present disclosure. As shown in FIGS. 5B and 5C, in the second navigation mode, computing module 130 is configured to calculate a navigation path to include a coverage region with navigation points 510, 520, 530, 540 as vertices of the coverage region. In the embodiment of FIG. 5B, computing module 130, in the second navigation mode, calculates the navigation path by applying a back-and-forth route pattern to include the coverage region. The calculated navigation path forms a z-shape, which is suitable when UGV 100 is traveling back and forth along furrows in a farm field to remove or disrupt vegetation such as weeds. In the embodiment of FIG. 5C, computing module 130, in the second navigation mode, calculates a navigation path by applying a spiral route pattern to include the coverage region. The spiral route pattern is suitable when UGV 100 is traveling in a non-rectangular region, such as a baseball field or putting green of a golf course. FIGS. 6A-6E are diagrams illustrating spiral route patterns to include the coverage regions having different shapes, consistent with some embodiments of the present disclosure.

In some embodiments, the user can manually select the route pattern to include the coverage region. For example, UGV 100 can receive a pattern selection signal from controller RC1 and apply a route pattern selected from multiple route pattern candidates, such as a back-and-forth route pattern and a spiral route pattern, based on the pattern selection signal received from controller RC1 to calculate the navigation path. In some embodiments, computing module 130 may also identify a shape of the coverage region based on the location information of navigation points 510, 520, 530, 540, and apply the route pattern selected from the route pattern candidates based on the identified shape of the coverage region to calculate the navigation path.

Reference is again made to FIG. 4. In the navigation mode, when a termination condition is satisfied (step 436—yes), UGV 100 performs step 450 and turn off motors 154*a*, 154*b*. For example, when UGV 100 arrives at an end point and the coverage region is all included, the navigation is completed and UGV 100 can stop and wait for a next command from the user. Otherwise (step 436—no), UGV 100 repeats steps 434 and 436 until the termination condition is satisfied.

When UGV 100 operates in the following mode, in step 442, UGV 100 identifies a target. In some embodiments, the target may be a movable target, such as a user. Computing module 130, by receiving signals or data from sensing module 120, determines location information of the movable target. In different embodiments, computing module 130 may identify the target using images captured by camera 122 or using signals received by UWB sensor 124.

Figure 7:
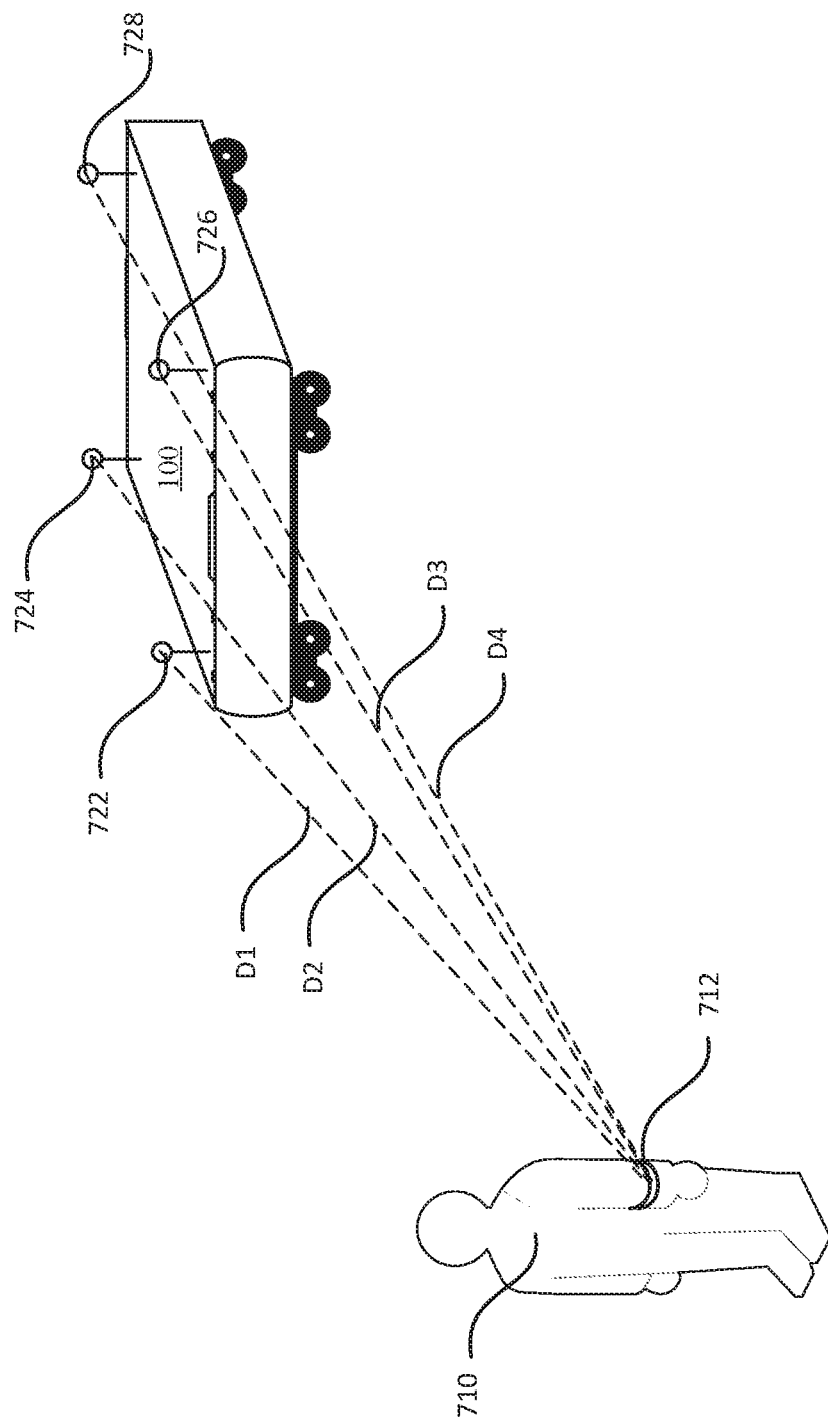
FIG. 7 is a diagram illustrating target identification using an ultra-wideband (UWB) sensor, consistent with some embodiments of the present disclosure.

For further understanding of step 442, reference is made to FIG. 7, which is a diagram illustrating target identification using UWB sensor 124, consistent with some embodiments of the present disclosure. As shown in FIG. 7, in some embodiments, a movable target 710, such as a user, may wear a UWB signal transmitter 712, which constantly emits UWB radio signals spread over a large bandwidth (e.g., over 500 MHz). UWB signal transmitter 712 may be in the form of a necklace, a wristband, a bracelet, etc. UWB sensor 124 may include multiple UWB receivers 722, 724, 726, and 728 mounted on different positions of UGV 100 and configured to receive UWB radio signals emitted from UWB signal transmitter 712. While UGV 100 shown in FIG. 7 includes four UWB receivers 722, 724, 726, and 728, the number of UWB receivers installed on UGV 100 may be modified based on actual needs. The embodiments illustrated in FIG. 7 is merely an example and not intended to limit the present disclosure.

Based on the radio signals received by UWB receivers 722, 724, 726, and 728, computing module 130 may respectively calculate distance values D1, D2, D3, and D4 between movable target 710 and UWB receivers 722, 724, 726, and 728. Then, computing module 130 may determine the location information of movable target 710 based on distance values D1, D2, D3, and D4. In addition, in some embodiments, computing module 130 may also determine the location information of movable target 710 when one or more UWB receivers 722, 724, 726, and 728 is unable to receive radio signals. For example, if a failure occurs in UWB receiver 722, computing module 130 may still locate movable target 710 based on distance values D2, D3, and D4 from the remaining UWB receivers 724, 726, and 728. If the number of failed UWB sensors exceeds a predetermined value, and computing module 130 is unable to locate movable target 710 using the remaining UWB receivers, UGV 100 may output a corresponding alert signal to indicate that UWB receivers need to be repaired.

Reference is again made to FIG. 4. After the location information of the movable target is determined, in step 444, UGV 100 is controlled, by computing module 130, to track and follow the movable target. More particularly, computing module 130 may calculate a direction and a speed for UGV 100 based on the determined location information of the movable target, and drive motors 154a, 154b accordingly to move UGV 100 in the calculated direction at the calculated speed to follow the movable target when the movable target moves.

When a termination condition is satisfied or a failure is detected (step 446—yes), UGV 100 performs step 450 and turn off motors 154a, 154b accordingly. Otherwise (step 446—no), UGV 100 repeats steps 444 and 446 to follow the movement of the movable target. For example, if a termination signal is received from controller RC1, or the location information of the movable target is unavailable, computing module 130 may stop UGV 100. In addition, in response to a determination that the location information of the movable target is unavailable, computing module 130 can further control UGV 100 to output a visual and/or audible alert signal via output devices 224 to notify the user.

By performing steps 442, 444, and 446 to operate in the following mode, UGV 100 can follow a farmer on a farm or in an orchard to assist in the fertilizing and/or watering process or assist in harvest work by carrying picked fruit or vegetables. Furthermore, the following mode may also be applied in an indoor or outdoor mobile vending machine following a salesperson in a campus or an amusement park, or applied in indoor or outdoor positioning and communication systems for logistics in a warehouse, a logistics center, a shopping mall, a hospital, a campus, an amusement park, etc.

In some other embodiments, instead of using UWB sensors for tracking the target, UGV 100 may also achieve the following mode by using images capture by camera 122. More particularly, UGV 100 can control camera 122 to capture multiple images, perform image recognition to identify the movable target in at least one of the images, and determine location information based on identifying the movable target in the image(s).

Figure 8:
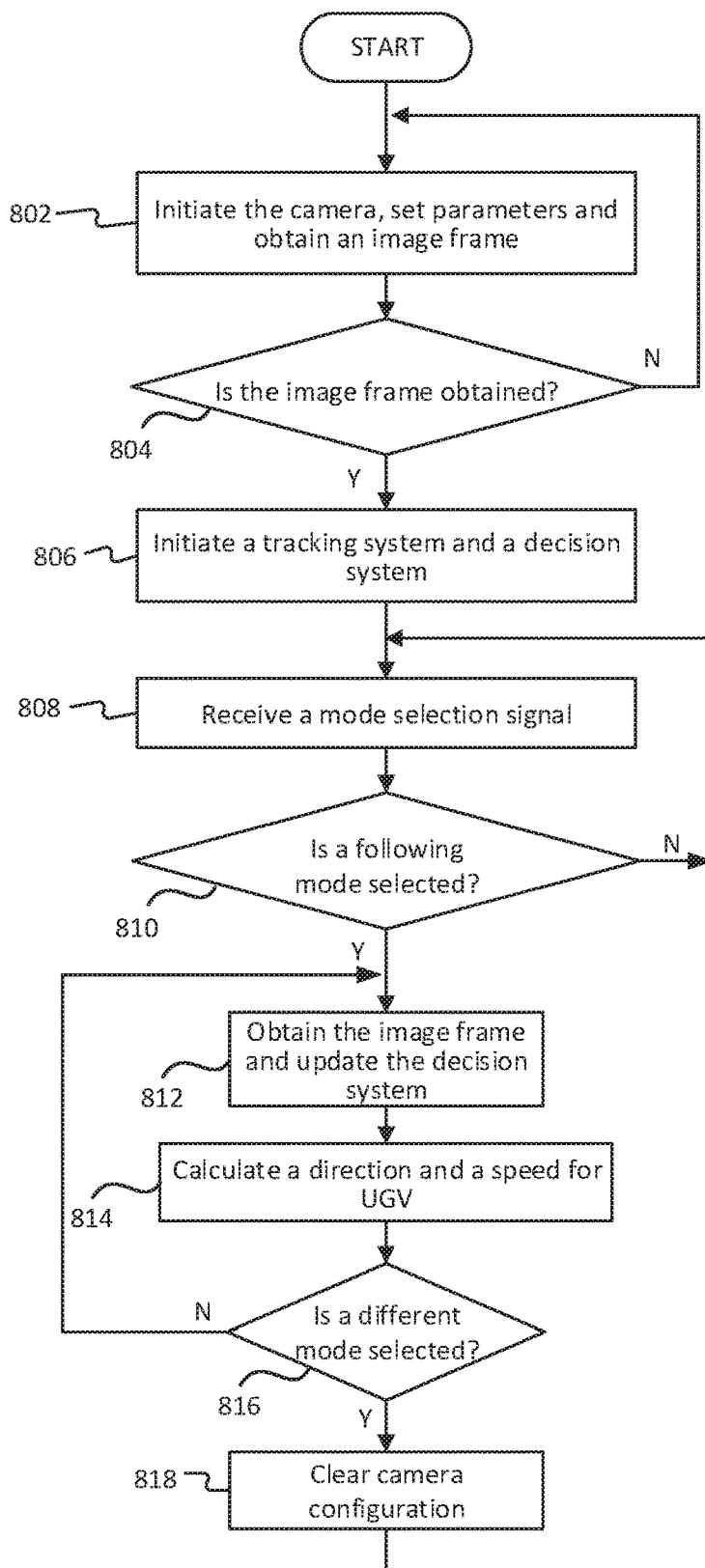
FIG. 8 is a flow diagram of operations of the UGV in a following mode using images, consistent with some embodiments of the present disclosure.

FIG. 8 is a flow diagram 800 of operations of the following mode using images captured by camera 122, consistent with some embodiments of the present disclosure. As shown in FIG. 8, in step 802, computing module 130 initiates camera 122, sets parameters and obtains an image frame, which indicates a region of a movable target in images captured by camera 122. For example, computing module 130 may perform an image recognition and processing algorithm to identify a user in the image and mark a corresponding region as the image frame.

In step 804, computing module 130 determines whether the image frame is obtained successfully. If the image frame is not obtained (step 804—no), computing module 130 repeats steps 802 and 804. When the initialization completes and the image frame is obtained (step 804—yes), in step 806 computing module 130 initiates a tracking system and a decision system for performing image recognition to track and determining the location information of the movable target. In some embodiments, the tracking system and the decision system may be software which implements corresponding tracking and decision algorithms and is executed by processor 134. In step 808, similar to step 410, computing module 130 receives a mode selection signal from controller RC1. In step 810, computing module 130 determines whether a following mode is selected based on the mode selection signal. If the following mode is selected (step 810—yes), in step 812, computing module 130 obtains a current image frame by the tracking system and updates the decision system accordingly. In step 814, computing module 130 calculates a direction and a speed for UGV 100 based on the location information of the movable target determined by the decision system.

In step 816, computing module 130 determines whether another operating mode is selected. Responsive to a determination that UGV 100 continues to operate in the following mode (step 816—no), computing module 130 repeats steps 812, 814, and 816 to update the direction and the speed for UGV 100 to follow the movable target, until another operating mode (e.g., the navigation mode or the manual mode) is selected (step 816—yes). When another operating mode is selected (step 816—yes), computing module 130 performs step 818 and clears configuration and/or settings of camera 122. Then, computing module 130 repeats step 808, waiting for a next command from controller RC1.

In the navigation mode or the following mode mentioned above, UGV 100 can enable the obstacle avoidance function to avoid obstacles on the navigation path. In addition, in the manual mode, the user can also enable or disable the obstacle avoidance function manually, which is discussed below.

Figure 9:
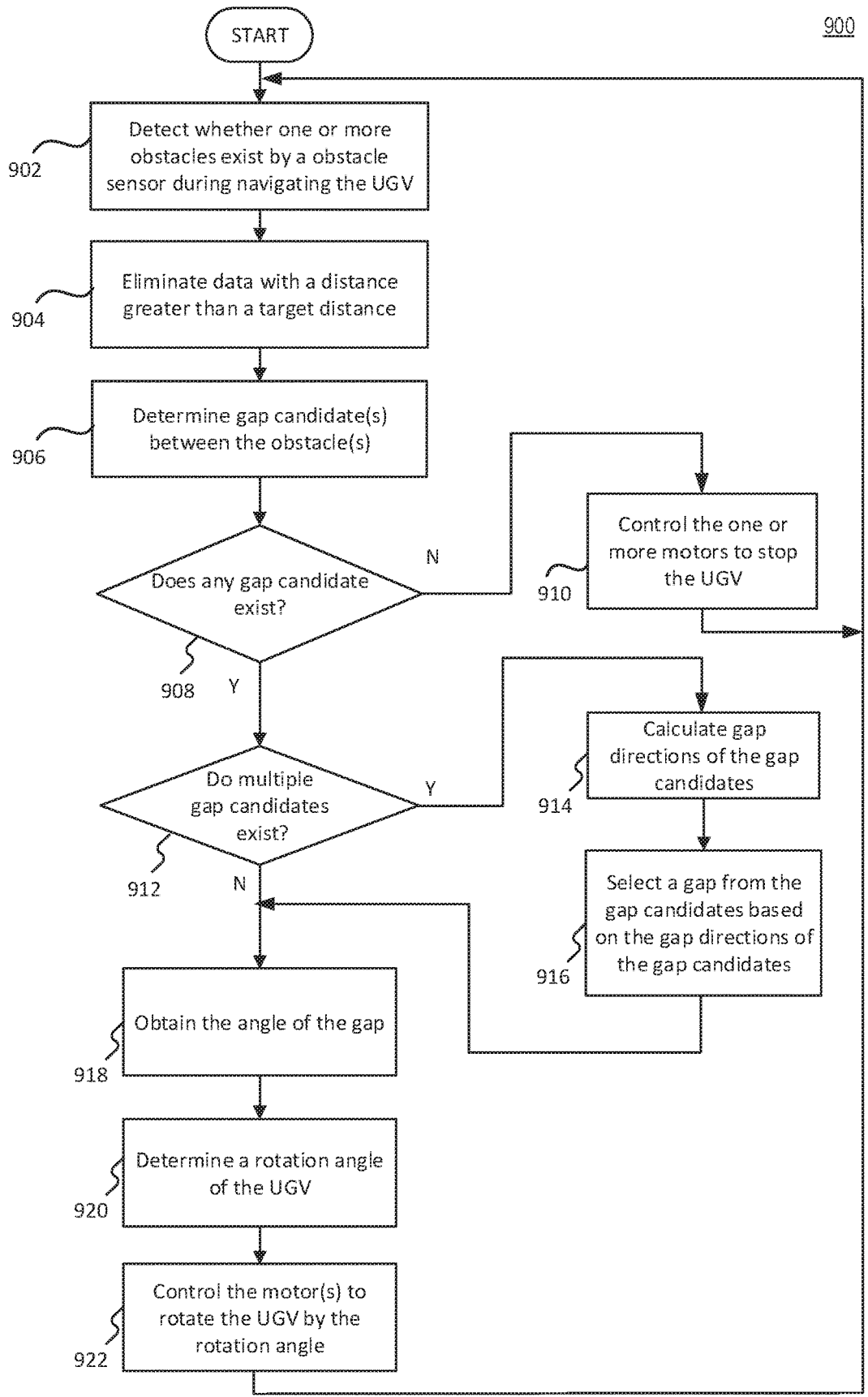
FIG. 9 is a flow diagram of an exemplary method for performing an obstacle avoidance function, consistent with some embodiments of the present disclosure.

FIG. 9 is a flow diagram of an exemplary method 900 for performing the obstacle avoidance function during movement of UGV 100, consistent with some embodiments of the present disclosure. In step 902, computing module 130 detects, by the obstacle sensor (e.g., LIDAR sensor 121 or ultrasound sensor 125), whether one or more obstacles exist while navigating UGV 100. If the obstacle sensor detects one or more obstacles, computing module 130 further determines location information of the obstacle(s) based on signals from the obstacle sensor. In step 904, UGV 100 eliminates obstacle data including objects at a distance greater than a target distance. For example, in some embodiments, UGV 100 eliminates obstacle data including objects at a distance greater than 2 meters. In step 906, if one or more obstacles are detected, UGV 100 determines whether one or more gap candidates exist between the obstacle(s) based on the location information of the obstacle(s). For example, computing module 130 may perform a calculation to determine if any "gaps" exist between the obstacle(s). Accordingly, UGV 100 can update the navigation path based on the location information of obstacle(s), so that UGV 100 can pass through the gap and continue the navigation.

In step 908, UGV 100 determines whether any gap candidates exist. In response to a determination that no gap candidate exists (step 908—no), in step 910 UGV 100 controls motors 154a, 154b to stop UGV 100. If one or more gap candidates exist (step 908—yes), in step 912 UGV 100 further determines whether multiple gap candidates exist. In response to a determination that multiple gap candidates exist (step 912—yes), in step 914 UGV 100 calculates respective gap directions of the gap candidates and calculates error values between a target navigation direction and the respective gap directions. Then, in step 916, UGV 100 selects one of the gap candidates based on the error values.

More particularly, in some embodiments, the target navigation direction may be the direction towards the next navigation point from the current location of UGV 100. UGV 100 may choose the gap candidate which has a smallest difference between the direction towards the next navigation point and the gap direction. Thus, UGV 100 can optimize its navigation path when avoiding the obstacle(s).

After selecting the gap candidate, in steps 918, 920, and 922, UGV 100 updates the navigation path to navigate UGV 100 through the selected gap candidate. On the other hand, if only one gap candidate exists (step 912—no), UGV 100 performs steps 918, 920, and 922 directly and updates the navigation path to navigate UGV 100 through the only gap candidate identified. Accordingly, UGV 100 navigates along the updated navigation path to avoid the one or more obstacles in the previous path.

As shown in FIG. 9, in step 918, UGV 100 calculates a target direction based on the updated navigation path. For example, computing module 130 may calculate the direction from the current position of UGV 100 obtained by position sensor 123 to the position of a next navigation point in the updated navigation path as the target direction. In step 920, UGV 100 determines a rotation angle of UGV 100 based on a current direction of UGV 100 and the target direction. In some embodiments, the current direction of UGV 100 can be obtained by an electronic compass included in sensing module 120 and installed in UGV 100. Computing module 130 may calculate a difference between the target direction and the current direction of UGV 100 to determine the rotation angle required. Then, in step 922, UGV 100 controls motors 154a, 154b to rotate UGV 100 by the determined rotation angle. By implementing method 900 described above and repeating steps 902-922, UGV 100 can achieve the obstacle avoidance function in any one of the operation modes mentioned above. That is, computing module 130 can perform the obstacle avoidance function described above in the navigation mode, in the following mode, or in the manual mode.

In view of above, in various embodiments of the present disclosure, UGV 100 can be configured in different operation modes for different application scenarios. In a navigation mode, UGV 100 may determine the navigation paths based on the navigation points. According to an instruction from the user or according to a determination by computing module 130, UGV 100 can move between the navigation points repeatedly, or cover a coverage region with the navigation points as vertices by a back-and-forth route pattern, a spiral route pattern or any other applicable patterns. In a following mode, UGV 100 can locate a movable target by image recognition methods or by radio signals received from a signal transmitting device on the movable target and follow UGV 100. In a manual mode, the user can send commands by the controller to control the movement of UGV 100. In any of the modes described above, UGV 100 may control or actuate one or more function devices, such as a cutting device or a spray device, and perform obstacle avoidance and/or collision avoidance. For example, obstacle avoidance can be achieved by detecting obstacle(s) in the current navigation path and updating the navigation path based on the location information of the obstacles. In addition, collision avoidance can be achieved by detecting obstacle(s) and controlling UGV 100 to lower speed or to stop if the distance between the obstacle(s) and UGV 100 meets respective thresholds. Accordingly, UGV 100 has high flexibility and can be adapted into a wide range of applications.

The various example embodiments herein are described in the general context of method steps or processes, which may be implemented in one aspect by a computer program product, embodied in a transitory or a non-transitory computer-readable medium, including computer-executable instructions, such as program code, executed by computers in networked environments. A computer-readable medium may include removable and nonremovable storage devices including, but not limited to, Read Only Memory (ROM), Random Access Memory (RAM), compact discs (CDs), digital versatile discs (DVD), etc.

Generally, program modules may include routines, programs, objects, components, data structures, etc., that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the foregoing specification, embodiments have been described with reference to numerous specific details that can vary from implementation to implementation. Certain adaptations and modifications of the described embodiments can be made. It is also intended that the sequence of steps shown in figures are only for illustrative purposes and are not intended to be limited to any particular sequence of steps. As such, those skilled in the art can appreciate that these steps can be performed in a different order while implementing the same method.

As used herein, unless specifically stated otherwise, the term "or" encompasses all possible combinations, except where infeasible. For example, if it is stated that a module may include A or B, then, unless specifically stated otherwise or infeasible, the module may include A, or B, or A and B. As a second example, if it is stated that a module may include A, B, or C, then, unless specifically stated otherwise or infeasible, the module may include A, or B, or C, or A and B, or A and C, or B and C, or A and B and C.

In the drawings and specification, there have been disclosed exemplary embodiments. It will be apparent to those skilled in the art that various modifications and variations can be made to the disclosed system and related methods. Other embodiments will be apparent to those skilled in the art from consideration of the specification and practice of the disclosed system and related methods. It is intended that the specification and examples be considered as exemplary only, with a true scope being indicated by the following claims and their equivalents.

What is claimed is:

1. A non-transitory computer-readable medium storing instructions executable by a processor to perform a method for operating an unmanned ground vehicle including one or more motors and an obstacle sensor, the method comprising:
obtaining location information of a plurality of navigation points;

calculating a navigation path based on the obtained location information;

driving the one or more motors to navigate the unmanned ground vehicle along the navigation path;

determining whether the unmanned ground vehicle is operated in an alley mode in which the unmanned ground vehicle is navigated along an alley navigation path, wherein the alley mode is set by an external remote controller;

in response to a determination that the unmanned ground vehicle is operated in the alley mode, inactivating the obstacle sensor to stop detecting whether one or more obstacles exist;

in response to a determination that the unmanned ground vehicle is not operated in the alley mode, detecting, by the obstacle sensor, whether one or more obstacles exist while navigating the unmanned ground vehicle, and if detected, determining location information of the one or more obstacles;

eliminating, directly after determining the location information of the one or more obstacles, obstacle data of the one or more obstacles at a distance greater than a target distance;

if the one or more obstacles are detected by the obstacle sensor, updating, after the eliminating, the navigation path based on the determined location information of the one or more obstacles, wherein:
 if two or more obstacles are detected, determining whether one or more gap candidates exist between the two or more obstacles based on the determined location information of the two or more obstacles;
 in response to a determination that a plurality of gap candidates exist, selecting one of the gap candidates from the plurality of gap candidates; and
 updating the navigation path to navigate the unmanned ground vehicle through the one of the gap candidates selected from the plurality of gap candidates; and if the one or more obstacles are detected by the obstacle sensor, controlling the one or more motors to lower a speed of the unmanned ground vehicle in response to a detected distance between the one or more detected obstacles and the unmanned ground vehicle being less than a first threshold, controlling the one or more motors to stop the unmanned ground vehicle in response to the detected distance being less than a second threshold smaller than the first threshold, and after the speed of the unmanned ground vehicle is lowered, controlling the one or more motors to increase the speed of the unmanned ground vehicle to resume a normal operation in response to a determination that the one or more detected obstacles are no longer in the navigation path.

2. The non-transitory computer-readable medium of claim 1, the obtaining comprising:
 receiving a recording signal from the external remote controller operated by a user; and
 in response to receiving the recording signal, recording global positioning system (GPS) coordinates of the unmanned ground vehicle as the location information of one of the navigation points.

3. The non-transitory computer-readable medium of claim 1, the obtaining comprising:
 receiving the location information of the plurality of navigation points inputted by a user from the external remote controller of the unmanned ground vehicle operated by the user.

4. The non-transitory computer-readable medium of claim 1, the calculating comprising:
 in a first navigation mode, calculating the navigation path to move the unmanned ground vehicle between the plurality of navigation points; and
 in a second navigation mode, calculating the navigation path to include a coverage region with the plurality of navigation points as vertices of the coverage region.

5. The non-transitory computer-readable medium of claim 4, the calculating further comprising:
 in the second navigation mode, calculating the navigation path by applying a back-and-forth route pattern to include the coverage region.

6. The non-transitory computer-readable medium of claim 4, the calculating further comprising:
 in the second navigation mode, calculating the navigation path by applying a spiral route pattern to include the coverage region.

7. The non-transitory computer-readable medium of claim 4, the calculating further comprising:
 in the second navigation mode, receiving a pattern selection signal from the external remote controller of the unmanned ground vehicle operated by a user; and
 applying a route pattern selected from a plurality of route pattern candidates based on the pattern selection signal received from the external remote controller to calculate the navigation path, wherein the plurality of route pattern candidates comprise a back-and-forth route pattern and a spiral route pattern.

8. The non-transitory computer-readable medium of claim 4, the calculating further comprising:
 in the second navigation mode, identifying a shape of the coverage region based on the location information of the plurality of navigation points; and
 applying a route pattern selected from a plurality of route pattern candidates based on the identified shape of the coverage region to calculate the navigation path, wherein the plurality of route pattern candidates comprise a back-and-forth route pattern and a spiral route pattern.

9. The non-transitory computer-readable medium of claim 1, the updating comprising:
 in response to a determination that one gap candidate exists, updating the navigation path to navigate the unmanned ground vehicle through the gap candidate.

10. The non-transitory computer-readable medium of claim 1, the updating further comprising:
 in response to a determination that no gap candidate exists, controlling the one or more motors to stop the unmanned ground vehicle.

11. The non-transitory computer-readable medium of claim 1, the updating further comprising:
 calculating a target direction based on the updated navigation path;
 determining a rotation angle of the unmanned ground vehicle based on a current direction of the unmanned ground vehicle and the target direction; and
 controlling the one or more motors to rotate the unmanned ground vehicle by the rotation angle.

12. The non-transitory computer-readable medium of claim 1, the unmanned ground vehicle comprising a cutting device, the method further comprising:
 activating the cutting device to remove or disrupt vegetation along the navigation path.

13. The non-transitory computer-readable medium of claim 12, the method further comprising:

controlling a rotation speed of the cutting device based on a speed of the unmanned ground vehicle.

14. The non-transitory computer-readable medium of claim 1, the unmanned ground vehicle comprising a spray device, the method further comprising:
activating the spray device to spray liquid along the navigation path.

15. The non-transitory computer-readable medium of claim 14, the method further comprising:
controlling the spray device to determine an amount of liquid being sprayed based on a speed of the unmanned ground vehicle.

16. A method for operating an unmanned ground vehicle including one or more motors and an obstacle sensor, comprising:
obtaining location information of a plurality of navigation points;
calculating a navigation path based on the obtained location information;
driving the one or more motors to navigate the unmanned ground vehicle along the navigation path;
determining whether the unmanned ground vehicle is operated in an alley mode in which the unmanned ground vehicle is navigated along an alley navigation path, wherein the alley mode is set by an external remote controller;
in response to a determination that the unmanned ground vehicle is operated in the alley mode, inactivating the obstacle sensor to stop detecting whether one or more obstacles exist;
in response to a determination that the unmanned ground vehicle is not operated in the alley mode, detecting, by the obstacle sensor, whether one or more obstacles exist while navigating the unmanned ground vehicle, and if detected, determining location information of the one or more obstacles;
eliminating, directly after determining the location information of the one or more obstacles, obstacle data of the one or more obstacles at a distance greater than a target distance;
if the one or more obstacles are detected by the obstacle sensor, updating, after the eliminating, the navigation path based on the determined location information of the one or more obstacles, wherein:
if two or more obstacles are detected, determining whether one or more gap candidates exist between the two or more obstacles based on the determined location information of the two or more obstacles;
in response to a determination that a plurality of gap candidates exist, selecting one of the gap candidates from the plurality of gap candidates; and
updating the navigation path to navigate the unmanned ground vehicle through the one of the gap candidates selected from the plurality of gap candidates; and
if the one or more obstacles are detected by the obstacle sensor, controlling the one or more motors to lower a speed of the unmanned ground vehicle in response to a detected distance between the one or more detected obstacles and the unmanned ground vehicle being less than a first threshold, controlling the one or more motors to stop the unmanned ground vehicle in response to the detected distance being less than a second threshold smaller than the first threshold, and after the speed of the unmanned ground vehicle is lowered, controlling the one or more motors to increase the speed of the unmanned ground vehicle to resume a normal operation in response to a determination that the one or more detected obstacles are no longer in the navigation path.

17. The method of claim 16, the obtaining comprising:
receiving a recording signal from the external remote controller operated by a user; and
in response to receiving the recording signal, recording global positioning system (GPS) coordinates of the unmanned ground vehicle as the location information of one of the navigation points.

18. The method of claim 16, the obtaining comprising:
receiving the location information of the plurality of navigation points inputted by a user from the external remote controller of the unmanned ground vehicle operated by the user.

19. The method of claim 16, the calculating comprising:
in a first navigation mode, calculating the navigation path to move the unmanned ground vehicle between the plurality of navigation points; and
in a second navigation mode, calculating the navigation path to include a coverage region with the plurality of navigation points as vertices of the coverage region.

20. The method of claim 19, the calculating further comprising:
in the second navigation mode, calculating the navigation path by applying a back-and-forth route pattern to include the coverage region.

21. The method of claim 19, the calculating further comprising:
in the second navigation mode, calculating the navigation path by applying a spiral route pattern to include the coverage region.

22. The method of claim 19, the calculating further comprising:
in the second navigation mode, receiving a pattern selection signal from the external remote controller of the unmanned ground vehicle operated by a user; and
applying a route pattern selected from a plurality of route pattern candidates based on the pattern selection signal received from the external remote controller to calculate the navigation path, wherein the plurality of route pattern candidates comprise a back-and-forth route pattern and a spiral route pattern.

23. The method of claim 19, the calculating further comprising:
in the second navigation mode, identifying a shape of the coverage region based on the location information of the plurality of navigation points; and
applying a route pattern selected from a plurality of route pattern candidates based on the identified shape of the coverage region to calculate the navigation path, wherein the plurality of route pattern candidates comprise a back-and-forth route pattern and a spiral route pattern.

24. The method of claim 16, the updating comprising:
in response to a determination that one gap candidate exists, updating the navigation path to navigate the unmanned ground vehicle through the gap candidate.

25. The method of claim 16, the updating further comprising:
in response to a determination that no gap candidate exists, controlling the one or more motors to stop the unmanned ground vehicle.

26. The method of claim 16, the updating further comprising:
calculating a target direction based on the updated navigation path;

determining a rotation angle of the unmanned ground vehicle based on a current direction of the unmanned ground vehicle and the target direction; and controlling the one or more motors to rotate the unmanned ground vehicle by the rotation angle.

27. The method of claim 16, the unmanned ground vehicle comprising a cutting device, the method further comprising:

activating the cutting device to remove or disrupt vegetation along the navigation path.

28. The method of claim 27, the method further comprising:

controlling a rotation speed of the cutting device based on a speed of the unmanned ground vehicle.

29. The method of claim 16, the unmanned ground vehicle comprising a spray device, the method further comprising:

activating the spray device to spray liquid along the navigation path.

30. The method of claim 29, the method further comprising:

controlling the spray device to determine an amount of liquid being sprayed based on a speed of the unmanned ground vehicle.

31. An unmanned ground vehicle, comprising:

one or more motors configured to drive one or more wheels of the unmanned ground vehicle;

an obstacle sensor;

a memory storing instructions; and a processor coupled to the one or more motors, the obstacle sensor, and the memory, and configured to execute the instructions to cause the unmanned ground vehicle to:

obtain location information of a plurality of navigation points;

calculate a navigation path based on the obtained location information;

drive the one or more motors to navigate the unmanned ground vehicle along the navigation path;

determine whether the unmanned ground vehicle is operated in an alley mode in which the unmanned ground vehicle is navigated along an alley navigation path, wherein the alley mode is set by an external remote controller;

in response to a determination that the unmanned ground vehicle is operated in the alley mode, inactivate the obstacle sensor to stop detecting whether one or more obstacles exist;

in response to a determination that the unmanned ground vehicle is not operated in the alley mode, detect, by the obstacle sensor, whether one or more obstacles exist while navigating the unmanned ground vehicle, if detected, determine location information of the one or more obstacles;

eliminate, directly after determining the location information of the one or more obstacles, obstacle data of the one or more obstacles at a distance greater than a target distance;

if the one or more obstacles are detected by the obstacle sensor, after eliminating the obstacle data of the one or more obstacles at the distance greater than the target distance, update the navigation path based on the determined location information of the one or more obstacles by:

if two or more obstacles are detected, determining whether one or more gap candidates exist between the two or more obstacles based on the determined location information of the two or more obstacles;

in response to a determination that a plurality of gap candidates exist, selecting one of the gap candidates from the plurality of gap candidates; and updating the navigation path to navigate the unmanned ground vehicle through the one of the gap candidates selected from the plurality of gap candidates; and if the one or more obstacles are detected by the obstacle sensor, control the one or more motors to lower a speed of the unmanned ground vehicle in response to a detected distance between the one or more detected obstacles and the unmanned ground vehicle being less than a first threshold, control the one or more motors to stop the unmanned ground vehicle in response to the detected distance being less than a second threshold smaller than the first threshold, and after the speed of the unmanned ground vehicle is lowered, control the one or more motors to increase the speed of the unmanned ground vehicle to resume a normal operation in response to a determination that the one or more detected obstacles are no longer in the navigation path.

32. The unmanned ground vehicle of claim 31, wherein the processor is configured to execute the instructions to cause the unmanned ground vehicle to obtain the location information by:

receiving a recording signal from the external remote controller operated by a user; and in response to receiving the recording signal, recording global positioning system (GPS) coordinates of the unmanned ground vehicle as the location information of one of the navigation points.

33. The unmanned ground vehicle of claim 31, wherein the processor is configured to execute the instructions to cause the unmanned ground vehicle to obtain the location information by receiving the location information of the plurality of navigation points inputted by a user from the external remote controller of the unmanned ground vehicle operated by the user.

34. The unmanned ground vehicle of claim 31, wherein the processor is configured to execute the instructions to cause the unmanned ground vehicle to calculate the navigation path by:

in a first navigation mode, calculating the navigation path to move the unmanned ground vehicle between the plurality of navigation points; and in a second navigation mode, calculating the navigation path to include a coverage region with the plurality of navigation points as vertices of the coverage region.

35. The unmanned ground vehicle of claim 34, wherein the processor is further configured to execute the instructions to cause the unmanned ground vehicle to calculate the navigation path by:

in the second navigation mode, calculating the navigation path by applying a back-and-forth route pattern to include the coverage region.

36. The unmanned ground vehicle of claim 34, wherein the processor is further configured to execute the instructions to cause the unmanned ground vehicle to calculate the navigation path by:

in the second navigation mode, calculating the navigation path by applying a spiral route pattern to include the coverage region.

37. The unmanned ground vehicle of claim 34, wherein the processor is further configured to execute the instructions to cause the unmanned ground vehicle to calculate the navigation path by:

in the second navigation mode, receiving a pattern selection signal from the external remote controller of the unmanned ground vehicle operated by a user; and applying a route pattern selected from a plurality of route pattern candidates based on the pattern selection signal received from the external remote controller to calculate the navigation path, wherein the plurality of route pattern candidates comprise a back-and-forth route pattern and a spiral route pattern.

38. The unmanned ground vehicle of claim 34, wherein the processor is further configured to execute the instructions to cause the unmanned ground vehicle to calculate the navigation path by:

in the second navigation mode, identifying a shape of the coverage region based on the location information of the plurality of navigation points; and applying a route pattern selected from a plurality of route pattern candidates based on the identified shape of the coverage region to calculate the navigation path, wherein the plurality of route pattern candidates comprise a back-and-forth route pattern and a spiral route pattern.

39. The unmanned ground vehicle of claim 31, wherein the processor is configured to execute the instructions to cause the unmanned ground vehicle to update the navigation path by:

in response to a determination that one gap candidate exists, updating the navigation path to navigate the unmanned ground vehicle through the gap candidate.

40. The unmanned ground vehicle of claim 31, wherein the processor is further configured to execute the instructions to cause the unmanned ground vehicle to update the navigation path by:

in response to a determination that no gap candidate exists, controlling the one or more motors to stop the unmanned ground vehicle.

41. The unmanned ground vehicle of claim 31, wherein the processor is further configured to execute the instructions to cause the unmanned ground vehicle to update the navigation path by:

calculating a target direction based on the updated navigation path;

determining a rotation angle of the unmanned ground vehicle based on a current direction of the unmanned ground vehicle and the target direction; and controlling the one or more motors to rotate the unmanned ground vehicle by the rotation angle.

42. The unmanned ground vehicle of claim 31, further comprising:

a cutting device coupled to the processor, wherein the processor is further configured to execute the instructions to activate the cutting device to remove or disrupt vegetation along the navigation path.

43. The unmanned ground vehicle of claim 42, wherein the processor is further configured to execute the instructions to control a rotation speed of the cutting device based on a speed of the unmanned ground vehicle.

44. The unmanned ground vehicle of claim 31, further comprising:

a spray device coupled to the processor, wherein the processor is further configured to execute the instructions to activate the spray device to spray liquid along the navigation path.

45. The unmanned ground vehicle of claim 44, wherein the processor is further configured to execute the instructions to control the spray device to determine an amount of liquid being sprayed based on a speed of the unmanned ground vehicle.

* * * * *